United States Patent
Matsumoto et al.

(10) Patent No.: US 12,174,649 B2
(45) Date of Patent: Dec. 24, 2024

(54) ELECTRONIC DEVICE

(71) Applicant: Hitachi Astemo, Ltd., Hitachinaka (JP)

(72) Inventors: Masahiro Matsumoto, Tokyo (JP); Hiroshi Nakano, Tokyo (JP); Akira Kotabe, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 707 days.

(21) Appl. No.: 17/288,974

(22) PCT Filed: Oct. 23, 2019

(86) PCT No.: PCT/JP2019/041445
§ 371 (c)(1),
(2) Date: Apr. 27, 2021

(87) PCT Pub. No.: WO2020/100537
PCT Pub. Date: May 22, 2020

(65) Prior Publication Data
US 2021/0389787 A1    Dec. 16, 2021

(30) Foreign Application Priority Data
Nov. 12, 2018   (JP) ................................. 2018-211897

(51) Int. Cl.
*G05F 1/56* (2006.01)
*G01D 21/00* (2006.01)

(52) U.S. Cl.
CPC .............. *G05F 1/56* (2013.01); *G01D 21/00* (2013.01)

(58) Field of Classification Search
CPC ............ G05F 1/56; G05F 1/565; G01D 21/00
See application file for complete search history.

(56) References Cited

U.S. PATENT DOCUMENTS

| 2004/0095105 A1* | 5/2004 | Nakata ...................... G05F 1/56 323/280 |
| 2018/0304829 A1* | 10/2018 | Yanagawa ............... H01L 29/00 |
| 2020/0256928 A1* | 8/2020 | Tsutsumi ............... G01R 31/64 |

FOREIGN PATENT DOCUMENTS

| CN | 101546205 A | 9/2009 |
| CN | 106610683 A | 5/2017 |
| JP | 6-319265 A | 11/1994 |

(Continued)

OTHER PUBLICATIONS

Chinese-language Office Action issued in Chinese Application No. 201980064386.3 dated Feb. 24, 2022 with English translation (14 pages).

(Continued)

*Primary Examiner* — Xin Y Zhong
(74) *Attorney, Agent, or Firm* — Crowell & Moring LLP

(57) ABSTRACT

In a conventional electronic device, it is difficult to passively diagnose disconnection of an external capacitor added to an output terminal of a regulator circuit. An electronic device in this embodiment includes a regulator circuit 2 that outputs a constant voltage while external power supplied from the outside is input thereto, an external capacitor 3 connected to an output terminal of the regulator circuit 2 as an external component, an oscillation detector 4 that detects an oscillating state of the output voltage of the regulator circuit 2, and a failure determination unit 5 that outputs a failure signal when the oscillation detector 4 detects the oscillating state of the regulator circuit.

10 Claims, 4 Drawing Sheets

(56) References Cited

FOREIGN PATENT DOCUMENTS

| | | |
|---|---|---|
| JP | 2006-99500 A | 4/2006 |
| JP | 2007-252012 A | 9/2007 |
| JP | 2017-96671 A | 6/2017 |

OTHER PUBLICATIONS

Lanfang, L., "Gain adaptive control method of the voltage regulator for SVC in transmission system", China Academic Journal Electronic Publishing House, Power System Protection and Control, vol. 46, No. 3, Feb. 1, 2018, pp. 61-66, with English abstract (six (6) pages).

International Search Report (PCT/ISA/210) issued in PCT Application No. PCT/JP2019/041445 dated Jan. 7, 2020 with English translation (two (2) pages).

Japanese-language Written Opinion (PCT/ISA/237) issued in PCT Application No. PCT/JP2019/041445 dated Jan. 7, 2020 (three (3) pages).

Chinese-language Office Action issued in Chinese Application No. 201980064386.3 dated Jan. 4, 2023 with partial English translation (seven (7) pages).

\* cited by examiner

ELECTRONIC DEVICE

TECHNICAL FIELD

The present invention relates to an electronic device including a regulator circuit having an external capacitor added to an output terminal thereof, and more particularly, to an electronic device capable of detecting a disconnection failure of the external capacitor.

BACKGROUND ART

As an example of a method for diagnosing a disconnection failure of an external capacitor added to an output terminal of a regulator circuit, there is a technique described in PTL 1. PTL 1 explicitly discloses that the disconnection failure of the external capacitor is diagnosed by intentionally changing an output voltage of the regulator circuit, using the fact that an output current of the regulator circuit generated according to the change in output voltage varies depending on whether the external capacitor is present or absent.

CITATION LIST

Patent Literature

PTL 1: JP 2017-096671 A

SUMMARY OF INVENTION

Technical Problem

In PTL 1, in order to detect whether the external capacitor is disconnected from the regulator circuit, it is necessary to intentionally change the output voltage of the regulator circuit. Thus, when the regulator circuit is used in a circuit that is vulnerable to a fluctuation in power voltage, it is necessary to detect whether the external capacitor is disconnected from the regulator circuit or not after temporarily suspending the operation of the circuit. For this reason, the aforementioned conventional art has been applied in a limited range.

Under the aforementioned circumstances, an object of the present invention is to provide an electronic device capable of passively diagnosing disconnection of an external capacitor so that an output voltage of a regulator circuit can be kept in a stable state at all times and each circuit, to which power is supplied from the output voltage of the regulator circuit, can be operated without being stopped.

Solution to Problem

In order to solve the aforementioned problems, an electronic device according to the present invention includes an oscillation detector that detects an oscillating state of a regulator circuit having an output terminal to which an external capacitor is connected, and a failure determination unit that outputs a failure signal when the oscillation detector detects the oscillating state of the regulator circuit.

Advantageous Effects of Invention

According to the present invention, since the disconnection failure of the external capacitor added to the output terminal of the regulator circuit can be passively diagnosed, it is possible to provide an electronic device that can be applied even to a broader-range circuit configuration, particularly a circuit configuration that is easily affected by a fluctuation in power.

DESCRIPTION OF EMBODIMENTS

Hereinafter, embodiments of the present invention will be described with reference to the drawings. It should be noted that the respective embodiments can be combined as long as no contradiction occurs.

First Embodiment

Figure 1:
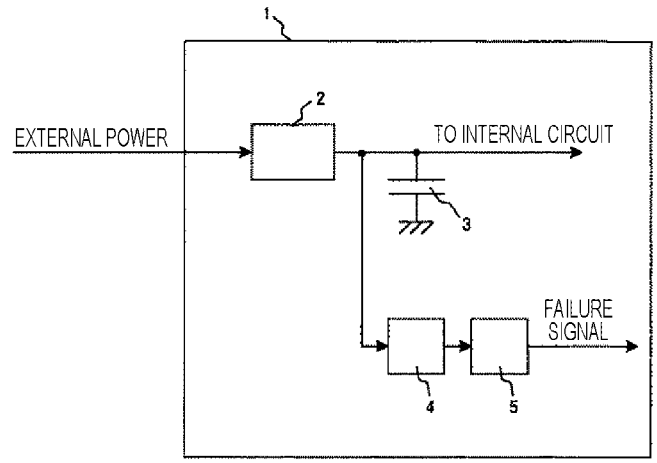
FIG. 1 shows a configuration of an electronic device according to a first embodiment.
Figure 4:
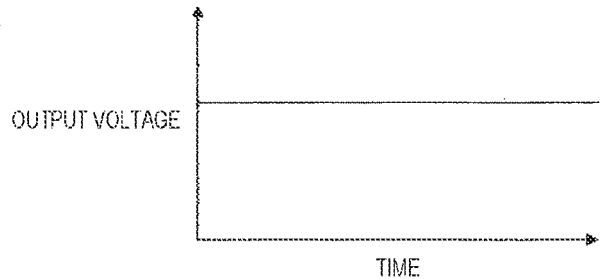
FIG. 4 shows an output voltage waveform of the regulator circuit in a normal state.
Figure 5:
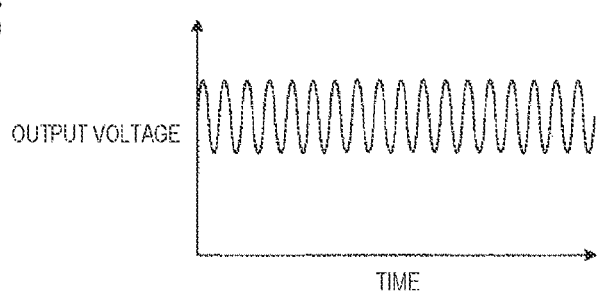
FIG. 5 shows an output voltage waveform of the regulator circuit when an external capacitor 3 is disconnected from the regulator circuit.
Figure 6:
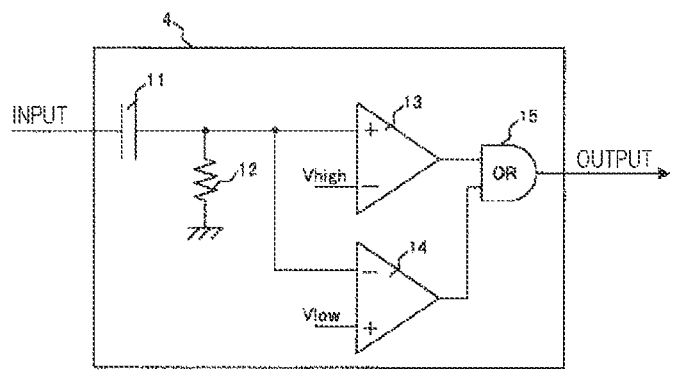
FIG. 6 shows a configuration of an oscillation detector 4.
Figure 7:
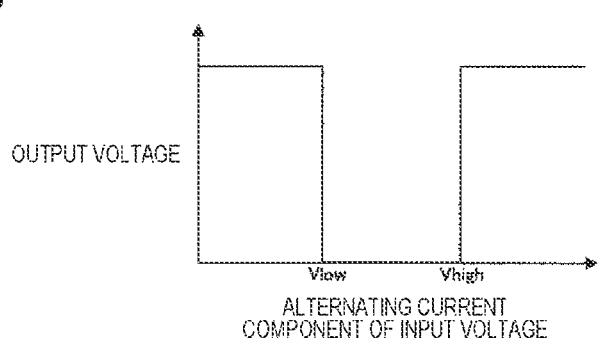
FIG. 7 shows an input/output characteristic of the oscillation detector 4.

First, a first embodiment of the present invention will be described with reference to FIGS. 1 to 7. FIG. 1 shows a configuration of an electronic device according to the first embodiment, FIG. 2 shows a configuration of a regulator circuit 2, FIG. 3 shows an open-loop frequency characteristic of the regulator circuit 2, FIG. 4 shows an output voltage waveform of the regulator circuit in a normal state, FIG. 5 shows an output voltage waveform of the regulator circuit when an external capacitor 3 is disconnected from the regulator circuit, FIG. 6 shows a configuration of an oscillation detector 4, and FIG. 7 shows an input/output characteristic of the oscillation detector 4.

The electronic device 1 in this embodiment includes a regulator circuit 2 that outputs a constant voltage while external power supplied from the outside is input thereto, an external capacitor 3 connected to an output terminal of the regulator circuit 2 as an external component, an oscillation detector 4 that detects an oscillating state of the output voltage of the regulator circuit 2, and a failure determination unit 5 that outputs a failure signal when the oscillation detector 4 detects the oscillating state of the regulator circuit 2.

Figure 2:
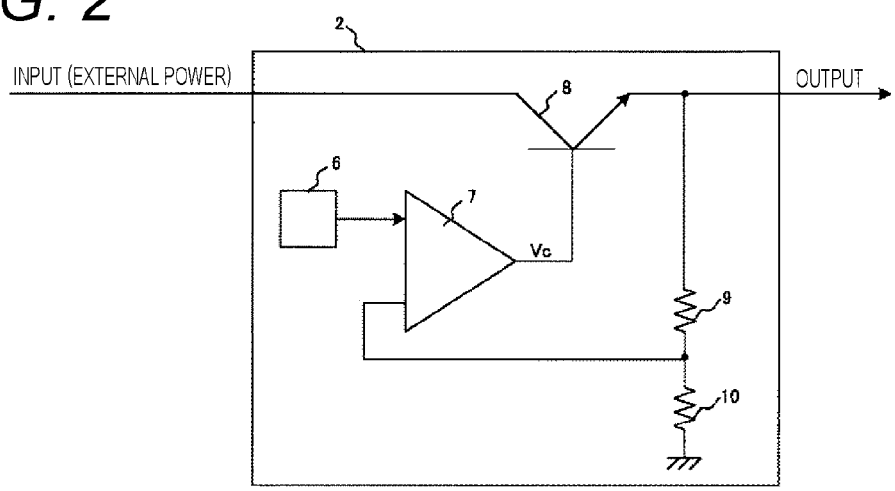
FIG. 2 shows a configuration of a regulator circuit 2.

As shown in FIG. 2, the regulator circuit 2 includes a reference voltage source 6 generating a reference voltage, an error amplifier 7, an output transistor 8, and resistor elements 9 and 10 dividing the output voltage of the regulator circuit 2 in a predetermined voltage ratio and giving feedback to the error amplifier 7.

Figure 3:
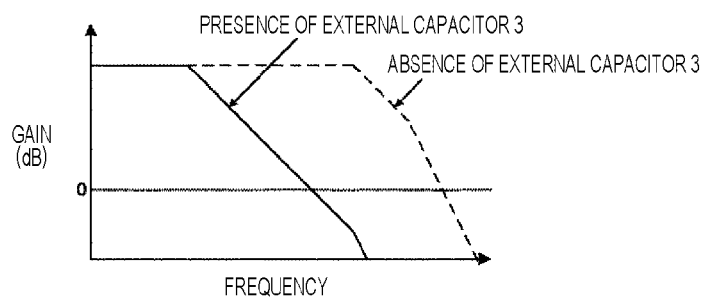
FIG. 3 shows an open-loop frequency characteristic of the regulator circuit 2.

In addition, as shown in FIG. 3, the regulator circuit 2 has an open-loop frequency characteristic, and the frequency characteristic varies depending on whether the external capacitor 3 is present or absent. As a result, the system is kept stable when the external capacitor 3 is present, but the system is not stable when the external capacitor 3 is absent. When the external capacitor 3 is present, the output voltage of the regulator circuit 2 is stable as shown in FIG. 4. On the other hand, when the external capacitor 3 is absent due to disconnection or the like, the regulator circuit 2 oscillates and the output voltage thereof vibrates greatly as shown in FIG. 5.

In this embodiment, the vibration of the output voltage of the regulator circuit 2 is detected using the oscillation detector 4. As shown in FIG. 6, the oscillation detector 4 may include a capacitor 11 and a resistor 12 constituting a high-pass filter that removes a direct current component of an input, a comparator 13 that outputs a high level when an output of the high-pass filter is larger than voltage Vhigh, a comparator 14 that outputs a high level when an output of the high-pass filter is smaller than voltage Vlow, and a logic gate 15 that calculates a logical sum from the comparator 13 and the comparator 14. That is, as shown in FIG. 7, the oscillation detector 4 outputs a high level when an alternating current component of an input voltage is larger than the voltage Vhigh or smaller than the voltage Vlow. It should be noted that the input voltage of the oscillation detector 4 may be a voltage Vc in FIG. 2 or an internal voltage of the error amplifier 7. The purpose of the oscillation detector 4 is to detect an oscillating state of the regulator circuit 2, and when the regulator circuit 2 is in the oscillating state, all voltages constituting the feedback system vibrate. Thus, the input voltage of the oscillation detector 4 may be an output voltage of the regulator circuit 2, a voltage Vc in FIG. 2, or an internal voltage of the error amplifier 7.

In this embodiment, it can be detected whether or not there is a disconnection failure of the external capacitor 3 by detecting whether the regulator circuit 2 is in an oscillating state. Accordingly, it can be passively detected whether or not there is a disconnection failure of the external capacitor 3 without affecting the operation of the regulator circuit 2. That is, it is possible to suppress a fluctuation in output voltage or an increase in noise of the regulator circuit 2, with almost no fluctuation in output voltage at the time of diagnosis during the operation of the regulator circuit 2 as shown in FIG. 4. Thus, an electronic circuit that is vulnerable to a fluctuation in power of the regulator circuit 2 or an electronic circuit that is easily affected by noise can be connected to the regulator circuit 2.

In addition, it is more preferable that the failure determination unit 5 outputs a failure signal when the oscillation detector 4 continuously outputs the detection of the oscillating state of the regulator circuit for a predetermined period of time or more.

Normally, the output voltage of the regulator circuit 2 is in an oscillating state when the function of the external capacitor 3 is lost due to the disconnection or failure of the external capacitor 3. Meanwhile, the output voltage of the regulator circuit 2 may fluctuate temporarily due to a sudden change in load current of the regulator circuit 2, a fluctuation in external voltage, or the like. Erroneous detection resulting from such a temporary fluctuation can be prevented by outputting a failure signal when the oscillation detector 4 outputs a high level indicating an oscillating state for a predetermined period of time or more.

It should be noted that the high level is output when the oscillation detector 4 detects the oscillation of the regulator circuit 2 in this embodiment, but a low level may be output when the oscillation is detected.

Second Embodiment

Figure 8:
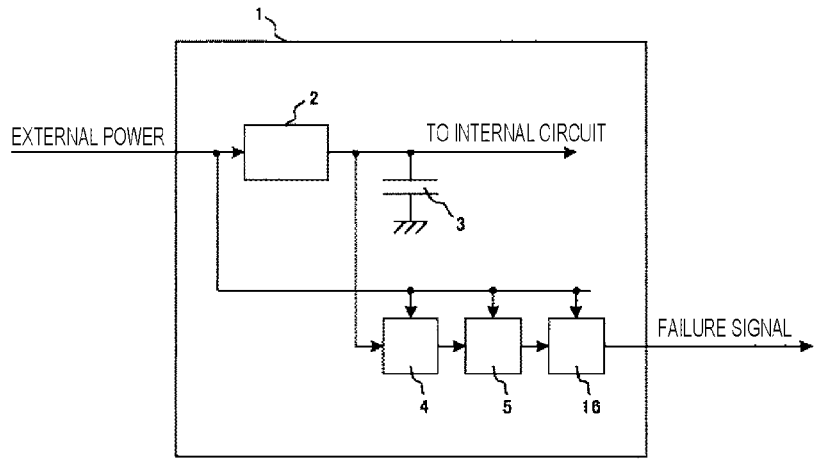
FIG. 8 shows a configuration of an electronic device according to a second embodiment.

Next, an electronic device according to a second embodiment of the present invention will be described with reference to FIG. 8. FIG. 8 shows a configuration of the electronic device according to the second embodiment. It should be noted that the description of the same configuration as that in the first embodiment will be omitted.

The electronic device in this embodiment is basically the same as that in the first embodiment, but an output circuit 16 for outputting a failure signal to a higher-level system is added thereto. By doing so, a failure of the electronic device 1 can be notified to the higher-level system, and accordingly, the higher-level system can be prevented from entering a fatal failure mode due to a fault caused by the failure of the electronic device 1.

In addition, the external power (the input voltage of the regulator circuit 2) is used as power of the oscillation detector 4. By doing so, even if the external capacitor 3 fails and the output voltage of the regulator circuit 2 vibrates greatly, the oscillation detector 4 can operate stably because the power of the oscillation detector 4 is supplied from the external power. If the power of the oscillation detector 4 is supplied from the output voltage of the regulator circuit 2, there is concern that, when the external capacitor 3 fails and the output voltage of the regulator circuit 2 vibrates greatly, the power voltage of the oscillation detector 4 may vibrate greatly accordingly, and the oscillation detector 4 may not operate properly. In this embodiment, however, this can be prevented.

In addition, the external power is used as power of the failure determination unit 5. By doing so, even if the external capacitor 3 fails and the output voltage of the regulator circuit 2 vibrates greatly, the failure determination unit 5 can operate stably because the power of the failure determination unit 5 is supplied from the external power. If the power of the failure determination unit 5 is supplied from the output voltage of the regulator circuit 2, there is concern that, when the external capacitor 3 fails and the output voltage of the regulator circuit 2 vibrates greatly, the power voltage of the failure determination unit 5 may vibrate greatly accordingly, and the failure determination unit 5 may not operate properly. In this embodiment, however, this can be prevented.

In addition, the external power is used as power of the output circuit 16. By doing so, even if the external capacitor 3 fails and the output voltage of the regulator circuit 2 vibrates greatly, the output circuit 16 can operate stably because the power of the output circuit 16 is supplied from the external power. If the power of the output circuit 16 is supplied from the output voltage of the regulator circuit 2, there is concern that, when the external capacitor 3 fails and the output voltage of the regulator circuit 2 vibrates greatly, the power voltage of the output circuit 16 may vibrate greatly accordingly, and the output circuit 16 may not operate properly. In this embodiment, however, this can be prevented.

Third Embodiment

Figure 9:
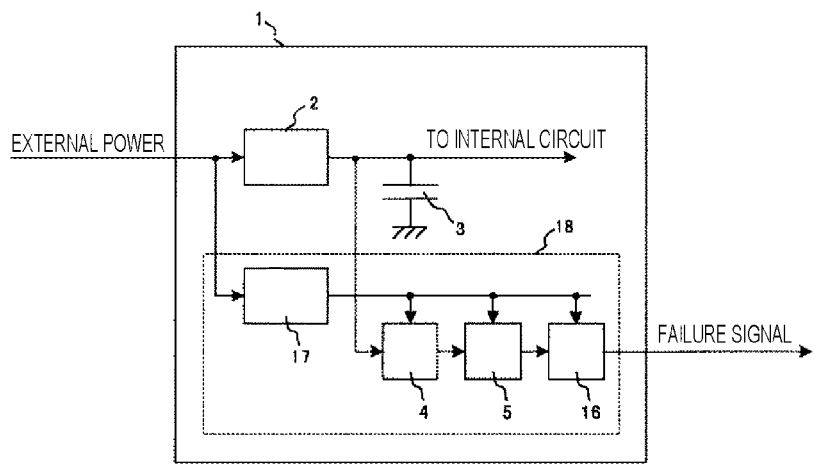
FIG. 9 shows a configuration of an electronic device according to a third embodiment.
Figure 10:
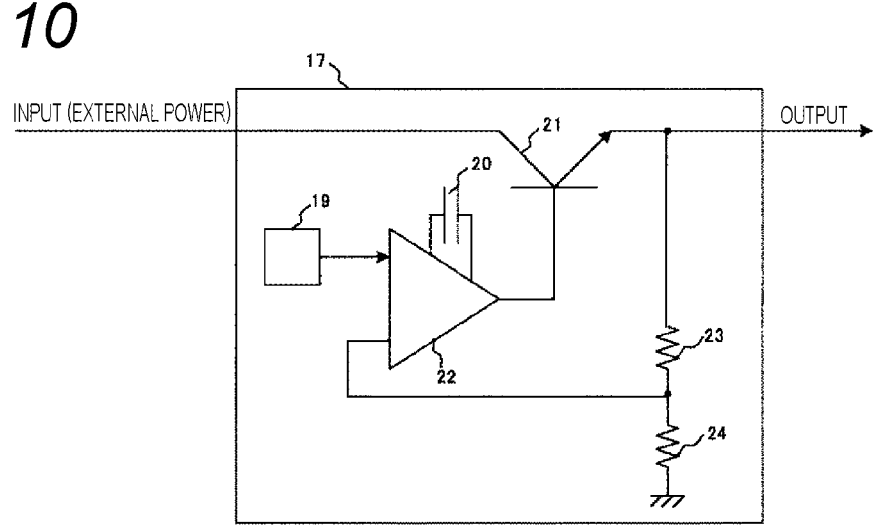
FIG. 10 shows a configuration of a second regulator circuit 17.
Figure 11:
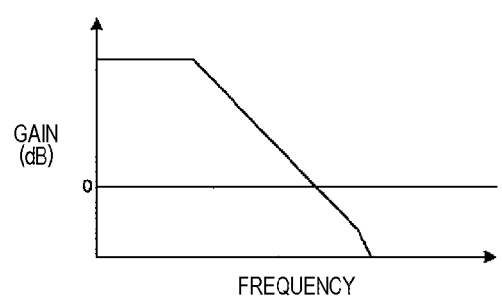
FIG. 11 shows an open-loop gain-frequency characteristic of the second regulator circuit.

Next, an electronic device according to a third embodiment of the present invention will be described with reference to FIGS. 9 to 11. FIG. 9 shows a configuration of the electronic device according to the third embodiment, FIG. 10 shows a configuration of a second regulator circuit 17, and FIG. 11 shows an open-loop gain-frequency characteristic of the second regulator circuit. It should be noted that the description of the same configuration as that in the first embodiment will be omitted.

The electronic device in this embodiment is basically the same as that in the first embodiment, but a second regulator circuit 17 is added, and an output voltage of the second regulator circuit is used as power of the oscillation detector 4, the failure determination unit 5, and the output circuit 16. It is more preferable in terms of miniaturization to integrate the second regulator circuit 17, the oscillation detector 4, the failure determination unit 5, and the output circuit 16 into a single LSI 18.

As shown in FIG. 10, the second regulator circuit 17 includes a reference voltage source 19 generating a reference voltage, an error amplifier 22, an output transistor 21, resistor elements 23 and 24 dividing the output voltage of the second regulator circuit 17 in a predetermined voltage ratio and giving feedback to the error amplifier 22, and a phase compensation capacitor 20 for stabilizing the feedback system. The phase compensation capacitor 20 causes the second regulator circuit 17 to have an open-loop frequency characteristic shown in FIG. 11, thereby stabilizing the feedback system. Thus, the second regulator circuit 17 does not require an external capacitor because no large-capacitance capacitor is required at an output terminal thereof, and can also be integrated into the LSI.

However, the regulator having such a configuration cannot output a high current and thus only a small-scale circuit can be driven thereby, but can highly increase reliability because all circuit elements constituting the regulator can be integrated. That is, in the third embodiment, more stable power can be supplied to the oscillation detector 4, the failure determination unit 5, and the output circuit 16 by adding the second regulator circuit 17. As a result, in this embodiment, the highly reliable and stable operation of the oscillation detector 4, the failure determination unit 5, and the output circuit 16 is ensured. According to this embodiment, the failure diagnosis of the external capacitor 3 can be performed more reliably.

This is because the second regulator circuit 17 makes it possible to supply a stable power voltage to the oscillation detector 4, the failure determination unit 5, and the output circuit 16 even when the voltage of the external power fluctuates. In addition, the second regulator circuit 17 makes it possible to stably operate the oscillation detector 4, the failure determination unit 5, and the output circuit 16 even when the external capacitor 3 fails due to a short circuit.

As a more preferable example, the output voltage of the second regulator circuit 17 can be set to be lower than the voltage of the regulator circuit 2 to improve the stability of the output voltage of the second regulator circuit 17 against a fluctuation in external power.

As a more preferable example, the second regulator circuit 17, the oscillation detector 4, the failure determination unit 5, and the output circuit 16 can be integrated into a single LSI to arrange mutual wiring on the LSI enabling highly reliable connection between the second regulator circuit 17, the oscillation detector 4, the failure determination unit 5, and the output circuit 16.

As a result, the external capacitor 3 can be diagnosed more stably.

Various examples of the electronic device in this embodiment may be considered, and one of the examples may be a physical quantity measurement device that measures at least any one kind of physical quantity such as a flow rate, a pressure, a humidity, or a temperature of a fluid.

REFERENCE SIGNS LIST

1 electronic device
2 regulator circuit
3 external capacitor
4 oscillation detector
5 failure determination unit
6 reference voltage source
7 error amplifier
8 output transistor
9 resistor element
10 resistor element
11 capacitor
12 resistor
13 comparator
14 comparator
15 logic gate
16 output circuit
17 second regulator circuit
18 LSI
19 reference voltage source
20 phase compensation capacitor
21 output transistor
22 error amplifier
23 resistor element
24 resistor element

The invention claimed is:

1. An electronic device, comprising:
   a first regulator circuit having an output terminal to which an external capacitor is connected;
   an oscillation detector that detects an oscillating state of the first regulator circuit, the oscillation detector including a high-pass filter that removes a DC component of an input to the oscillation detector; and
   a second regulator circuit;
   wherein an output voltage of the second regulator circuit is used as power of the oscillation detector; and
   wherein the second regulator circuit includes a phase compensation capacitor.

2. The electronic device according to claim 1, further comprising a failure determination unit that outputs a failure signal based on a signal from the oscillation detector.

3. The electronic device according to claim 2, wherein the failure determination unit outputs the failure signal when the oscillation detector continuously detects the oscillating state of the first regulator circuit for a predetermined period of time or more.

4. The electronic device according to claim 1, wherein an input voltage of the first regulator circuit is used as power of the oscillation detector.

5. The electronic device according to claim 1, wherein the output voltage of the second regulator circuit is lower than that of the first regulator circuit.

6. The electronic device according to claim 5, wherein the second regulator circuit and the oscillation detector are integrated into the same semiconductor element.

7. The electronic device according to claim 5, further comprising a failure signal output circuit that uses an output of the second regulator circuit as power thereof.

8. The electronic device according to claim 6, wherein the second regulator circuit, the oscillation detector, the failure determination unit, and an output circuit that transmits the output of the failure determination unit to the outside are integrated into the same semiconductor element.

9. The electronic device according to claim 1, wherein the electronic device is a physical quantity measurement device that measures a physical quantity of a fluid.

10. The electronic device according to claim 1, wherein the oscillation detector further includes a pair of comparators, including a first comparator that outputs a high level when an output of the high-pass filter is larger than first threshold voltage and a second comparator that outputs a high level when an output of the high-pass filter is below a second threshold voltage.

* * * * *